United States Patent
Weber et al.

(10) Patent No.: US 8,549,892 B2
(45) Date of Patent: *Oct. 8, 2013

(54) PORTABLE ELECTRONIC DEVICE AND METHOD OF MEASURING DROP IMPACT AT THE PORTABLE ELECTRONIC DEVICE

(75) Inventors: Arnett Ryan Weber, Waterloo (CA); Todd Robert Paleczny, Waterloo (CA); Denis Lahaie, Waterloo (CA)

(73) Assignee: BlackBerry Limited, Waterloo (CA)

( * ) Notice: Subject to any disclaimer, the term of this patent is extended or adjusted under 35 U.S.C. 154(b) by 145 days.

This patent is subject to a terminal disclaimer.

(21) Appl. No.: 13/251,019

(22) Filed: Sep. 30, 2011

(65) Prior Publication Data

US 2012/0029841 A1 Feb. 2, 2012

Related U.S. Application Data

(63) Continuation of application No. 12/488,829, filed on Jun. 22, 2009, now Pat. No. 8,061,182.

(51) Int. Cl.
*G01N 3/30* (2006.01)
*G01M 7/00* (2006.01)

(52) U.S. Cl.
USPC .................................. 73/12.06; 73/12.01

(58) Field of Classification Search
USPC .................... 73/12.01, 12.06, 12.14
See application file for complete search history.

(56) References Cited

U.S. PATENT DOCUMENTS

| | | | |
|---|---|---|---|
| 4,856,318 A * | 8/1989 | Hogan et al. ................. | 73/12.13 |
| 6,098,460 A | 8/2000 | Otsuchi et al. | |
| 6,601,436 B1 * | 8/2003 | Senda et al. ................. | 73/12.09 |
| 7,275,412 B2 | 10/2007 | Nishihara et al. | |
| 8,061,182 B2 * | 11/2011 | Weber et al. ................. | 73/12.06 |
| 8,145,441 B2 * | 3/2012 | Xi .................................... | 702/41 |
| 2005/0222801 A1 | 10/2005 | Wulff et al. | |
| 2006/0282021 A1 * | 12/2006 | DeVaul et al. ................. | 600/595 |
| 2008/0001607 A1 | 1/2008 | Horiguchi et al. | |

FOREIGN PATENT DOCUMENTS

EP 1286166 A1 2/2003

OTHER PUBLICATIONS

Office Action dated Dec. 7, 2012, issued from the corresponding European patent application No. 09163427.9.

Yu et al., "A Piezoelectric Actuator Driver Circuit for Automatic Focusing of Mobile Phone Cameras", University of Seoul, Samsung Electro-Mechanics, 2008 IEEE, pp. 2106-2109.

Laitinen et al., "Enabling Mobile Haptic Design: Piezoelectric Actuator Technology Properties in Hand Held Devices", IEEE International Workshop on Haptic Audio Visual Environments and their Applications, Ottawa, Canada, Nov. 4-5, 2006, pp. 40-43.

"Analog Devices' 3-Axis MEMS Accelerometer Available Now; Sets Ultra-Low Power Consumption Benchmark", Norwood, Mass., Business Wire, Oct. 31, 2005.

European Application No. 09163427.9, Search Report dated Oct. 7, 2009.

* cited by examiner

*Primary Examiner* — Max Noori
(74) *Attorney, Agent, or Firm* — Geoffrey deKleine; Borden Ladner Gervais LLP

(57) ABSTRACT

A method of measuring drop impact at an electronic device includes detecting a fall based on signals from drop detection sensor of the electronic device, receiving an output from a piezoelectric sensor in response to detecting the fall, and storing drop data based on the output from the piezoelectric sensor in a memory at the electronic device.

18 Claims, 6 Drawing Sheets

PORTABLE ELECTRONIC DEVICE AND METHOD OF MEASURING DROP IMPACT AT THE PORTABLE ELECTRONIC DEVICE

CROSS REFERENCE TO RELATED APPLICATIONS

This application is a continuation of U.S. patent application Ser. No. 12/488,829 filed Jun. 22, 2009, the contents of which is incorporated herein by reference in its entirety.

FIELD OF TECHNOLOGY

The present disclosure relates to portable electronic devices having a touch-sensitive input device including a mechanism for providing tactile feedback, and particularly to providing protection for the mechanism for providing tactile feedback.

BACKGROUND

Electronic devices, including portable electronic devices, have gained widespread use and can provide a variety of functions including, for example, telephonic, electronic messaging and other personal information manager (PIM) application functions. Portable electronic devices can include several types of devices including mobile stations such as simple cellular telephones, smart telephones, wireless PDAs, and laptop computers with wireless 802.11 or Bluetooth capabilities.

Devices such as PDAs or smart telephones are generally intended for handheld use and ease of portability. Smaller devices are generally desirable for portability. Touch screen assemblies constructed of a display, such as a liquid crystal display, with a touch-sensitive overlay are useful on such handheld devices as these handheld devices are small and are therefore limited in space available for user input and output devices. Further, the screen content on the touch screen devices can be modified depending on the functions and operations being performed. Touch screen devices that provide tactile feedback are particularly advantageous for providing positive feedback upon selection of a feature on the touch screen.

Such portable electronic devices are commonly mistakenly dropped and may be damaged as a result. Design of devices to protect device components in the event of a drop is desirable.

BRIEF DESCRIPTION OF THE DRAWINGS

Embodiments of the present disclosure will now be described, by way of example only, with reference to the attached Figures, wherein.

DETAILED DESCRIPTION

Figure 1:
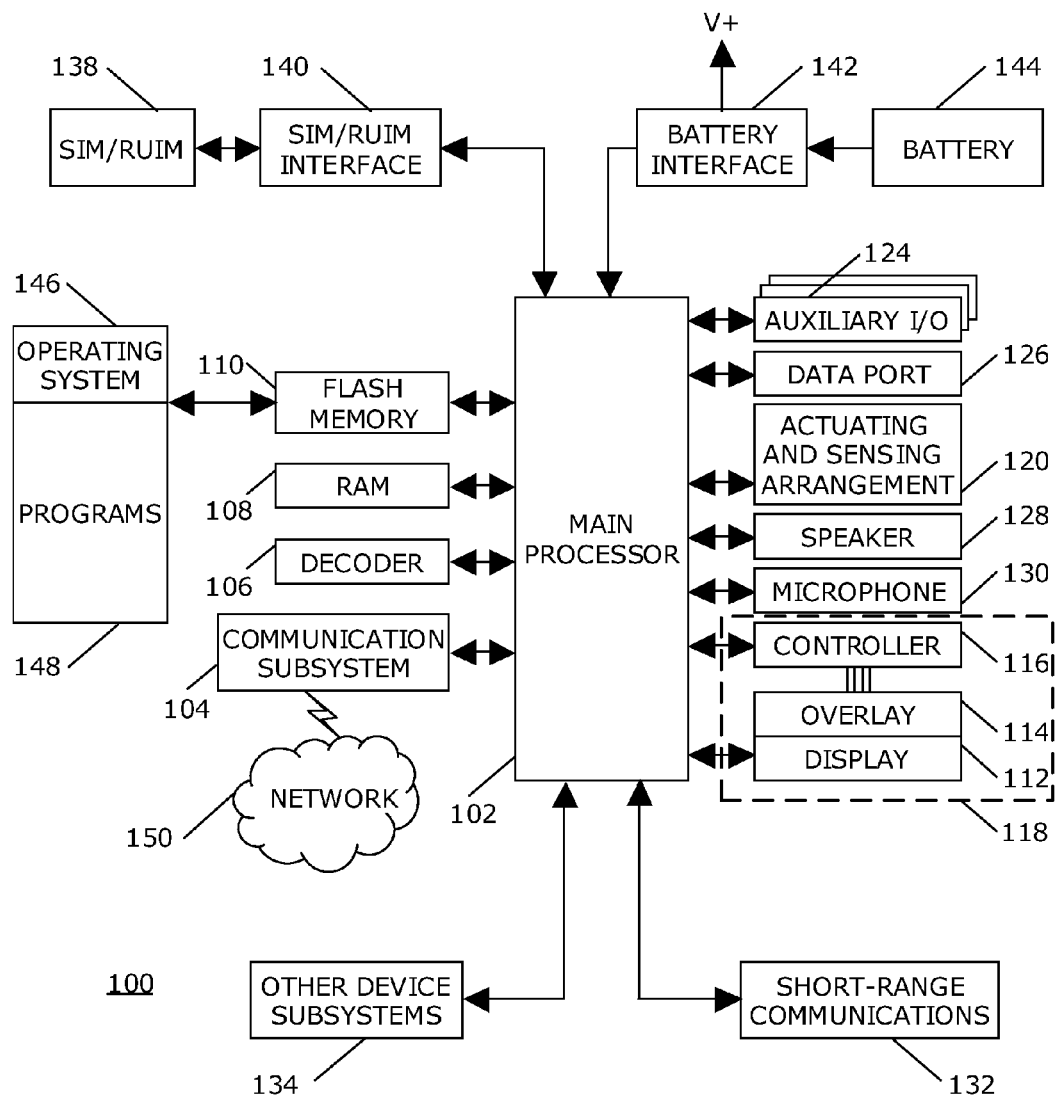
FIG. 1 is a simplified block diagram of components including internal components of an example portable electronic device according to one aspect.

For simplicity and clarity of illustration, reference numerals may be repeated among the figures to indicate corresponding or analogous elements. In addition, numerous specific details are set forth in order to provide a thorough understanding of the embodiments described herein. The example embodiments described herein may be practiced without these specific details. In other instances, well-known methods, procedures and components have not been described in detail so as not to obscure the example embodiments described herein. Also, the description is not to be considered as limited to the scope of the example embodiments described herein.

The disclosure generally relates to an electronic device, which in the example embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

A block diagram of an example of an example embodiment of a portable electronic device 100 is shown in FIG. 1. The portable electronic device 100 includes a number of components such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together make up a touch screen display 118, an actuating and sensing arrangement, an auxiliary input/output (I/O) subsystem 124, a data port 126, a speaker 128, a microphone 130, short-range communications 1112 and other device subsystems 1114. The processor 102 interacts with the touch-sensitive overlay 114 via the electronic controller 116.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The portable electronic device 100 also includes an operating system 146 and software components 148 that are executed by the processor 102 and are typically stored in a persistent store such as the flash memory 110. Additional applications may be loaded onto the portable electronic device 100 through the wireless network 150, the auxiliary I/O subsystem 124, the data port 126, the short-range communications subsystem 1112, or any other suitable device subsystem 1114.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is substantially similar except that the received signals are output to the speaker 128 and signals for transmission are generated by the microphone 130.

Figure 2:
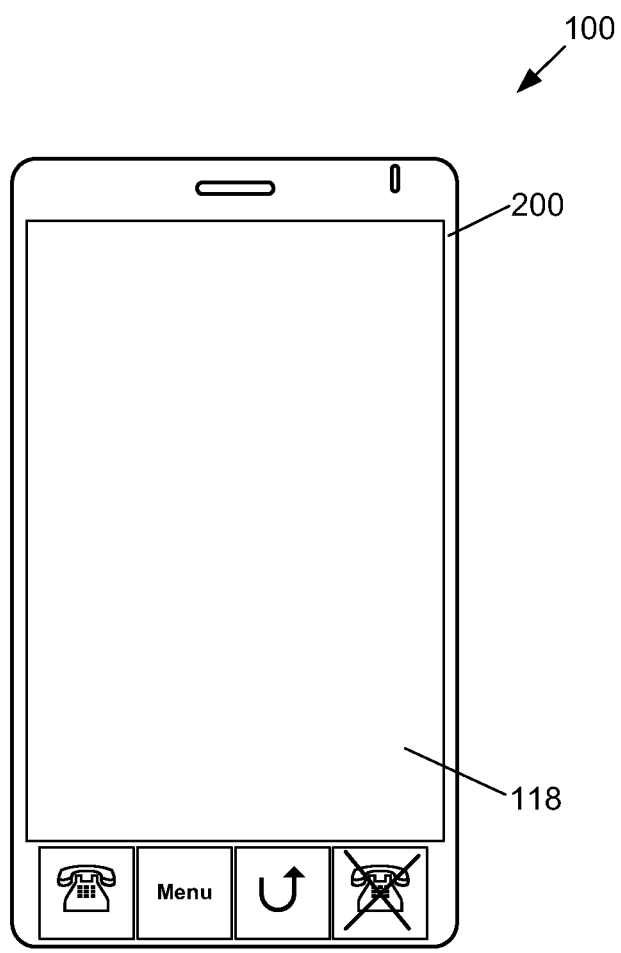
FIG. 2 is a front view of an example of an example portable electronic device in a portrait orientation.

FIG. 2 shows a front view of an example of a portable electronic device 100 in portrait orientation. The portable electronic device 100 includes a housing 200 that houses internal components including internal components shown in FIG. 1 and frames the touch screen display 118 such that the touch screen display 118 is exposed for user-interaction therewith when the portable electronic device 100 is in use. It will be appreciated that the touch screen display 118 may include any suitable number of user-selectable features rendered thereon, for example, in the form of virtual buttons for user-selection of, for example, applications, options, or keys of a keyboard for user entry of data during operation of the portable electronic device 100.

The touch screen display 118 may be any suitable touch screen display such as a capacitive touch screen display. A capacitive touch screen display includes the display 112 and the touch-sensitive overlay 114 in the form of a capacitive touch-sensitive overlay. A capacitive touch-sensitive overlay is an assembly of a number of layers in a stack and is fixed to the display 112 via a suitable optically clear adhesive. The coordinates (X and Y coordinates) of a touch event are determined with the X location determined by a signal generated as a result of capacitive coupling with one touch sensor layer and the Y location determined by the signal generated as a result of capacitive coupling with an other touch sensor layer. Each of the touch-sensor layers provides a signal to the controller 116 as a result of capacitive coupling, for example with a finger of a user, resulting in a change in the electric field of each of the touch sensor layers. The signals represent the respective coordinate values. Other attributes of the user's touch on the touch screen display 118 may also be determined. For example, the size and the shape of the touch on the touch screen display 118 may be determined in addition to the location (X and Y values) based on the signals received at the controller 116 from the touch sensor layers.

A touch event on the touch screen display 118 is determined by determining the coordinate values of the touch location and user-selected input is determined based on the coordinate values of the touch location and the application executed by the processor 102. Thus a feature such as a virtual button displayed on the touch screen display 118 is selected by matching the feature to the coordinate values of the touch location on the touch screen display 118.

Figure 3A:
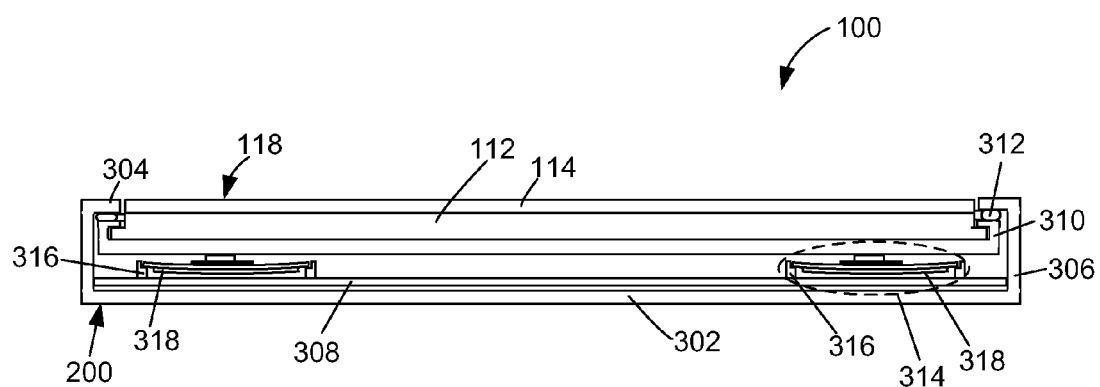
FIG. 3A is a sectional side view of portions of the portable electronic device of FIG. 2.
Figure 3B:
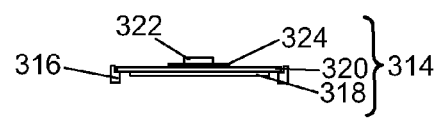
FIG. 3B is a side view of a portion of the portable electronic device shown in FIG. 3A.

The housing 200 can be any suitable housing for the internal components shown in FIG. 1. FIG. 3A shows a sectional side view of portions of the portable electronic device 100 and FIG. 3B shows a side view of a portion of the actuating and sensing arrangement 120. The housing 200 in the present example includes a back 302, a frame 304, which frames the touch screen display 118 and sidewalls 306 that extend between and generally perpendicular to the back 302 and the frame 304. A base 308 is spaced from and is generally parallel to the back 302. The base 308 can be any suitable base and can include, for example, a printed circuit board or flex circuit board supported by a stiff support between the base 308 and the back 302. The back 302 may include a plate (not shown) that is releasably attached for insertion and removal of, for example, the battery 144 and the SIM/RUIM card 138 referred to above. It will be appreciated that the back 302, the sidewalls 306 and the frame 304 may be injection molded, for example. In the example of the portable electronic device 100 shown in FIG. 2, the frame 304 is generally rectangular with rounded corners, although other shapes are possible.

The display 112 and the touch-sensitive overlay 114 are supported on a support tray 310 of suitable material such as magnesium for providing mechanical support to the display 112 and touch-sensitive overlay 114. A compliant gasket 312 is located around the perimeter of the frame 304, between an upper portion of the support tray 310 and the frame 304 to provide a gasket for protecting the components housed in the housing 200 of the portable electronic device 100. A suitable material for the compliant gasket 312 includes, for example, a cellular urethane foam for providing shock absorption, vibration damping and a suitable fatigue life.

Figure 4:
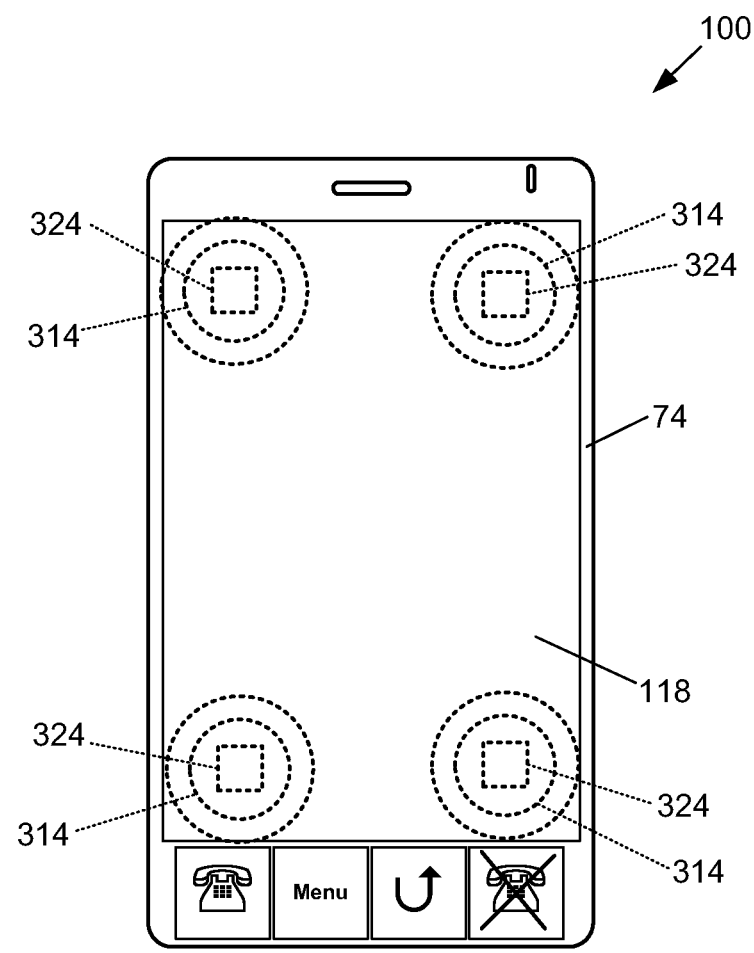
FIG. 4 is a front view of an example of a portable electronic device in a portrait orientation, showing hidden detail in ghost outline.

The actuating and sensing arrangement 120 includes four piezo disk actuators 314, as shown in FIG. 4, with each piezo disk actuator 314 located near a respective corner of the touch screen display 118. Referring again to FIGS. 3A and 3B, each piezo disk actuator 314 is supported on a respective support ring 316 that extends from the base 308 toward the touch screen display 118 for supporting the respective piezo disk actuator 314 while permitting flexing of the piezo disk actuator 314. Each piezo disk actuator 314 includes a piezoelectric disk 318 such as a PZT ceramic disk adhered to a metal substrate 320 of larger diameter than the piezoelectric disk 318 for bending when the piezoelectric disk 318 contracts as a result of build up of charge at the piezoelectric disk 318. Each piezo disk actuator 314 is supported on the respective support ring 316 on one side of the base 308, proximal a respective corner of the housing 200. The support 316 ring is sized such that the edge of the metal substrate 320 contacts the support ring 316 for supporting the piezo disk actuator 314 and permitting flexing of the piezo disk actuator 314. A shock-absorbing element 322, which in the present example is in the form of a cylindrical shock-absorber of suitable material such as a hard rubber is located between the piezo disk actuator 314 and the support tray 310. A respective force sensor 324 is located between each shock-absorbing element 322 and the respective piezo disk actuator 314. A suitable force sensor 322 includes, for example, a puck-shaped force sensing resistor for measuring applied force (or pressure). It will be appreciated that a force can be determined using a force sensing resistor as an increase in pressure on the force sensing resistor results in a decrease in resistance (or increase in conductance).

In the portable electronic device 100, each piezo disk actuator 314 is located between the base 308 and the support tray 310 and force is applied on each piezo disk actuator 314 by the touch screen display 118, in the direction of the base 308, causing bending of the piezo disk actuator 314. Thus, absent an external force applied by the user, for example by pressing on the touch screen display 118, and absent a charge on the piezo disk actuator 314, the piezo disk actuator 314 undergoes slight bending. An external applied force in the form of a user pressing on the touch screen display 118 during a touch event, and prior to actuation of the piezo disk actuator 314, causes increased bending of the piezo disk actuator 314 and the piezo disk actuator 314 applies a spring force against the touch screen display 118. When the piezoelectric disk 318 is charged, the piezoelectric disk 318 shrinks and causes the metal substrate 320 and piezoelectric disk 318 to apply a further force, opposing the external applied force, on the touch screen display 118 as the piezo actuator 314 straightens.

Each of the piezo disk actuators 314, shock absorbing elements 322 and force sensors 324 are supported on a respective one of the support rings 316 on one side of the base 308. The support rings can be part of the base 308 or can be supported on the base 308. The base 308 can be a printed circuit board while the opposing side of the base 308 provides mechanical support and electrical connection for other components (not shown) of the portable electronic device 20. Each piezo disk actuator 314 is located between the base 308 and the support tray 310 such that an external applied force on the touch screen display 118 resulting from a user pressing the touch screen display 118 can be measured by the force sensors 324 and such that the charging of the piezo disk actuator 314 causes a force on the touch screen display 118, away from the base 308.

In the present embodiment each piezo disk actuator 314 is in contact with the support tray 310. Thus, depression of the touch screen display 118 by user application of a force thereto is determined by a change in resistance at the force sensors 324 and causes further bending of the piezo disk actuators 314 as shown in FIG. 3A. Further, the charge on the piezo disk actuator 314 can be modulated to control the force applied by the piezo disk actuator 314 on the support tray 310 and the resulting movement of the touch screen display 118. The charge can be modulated by modulating the applied voltage or current. For example, a current can be applied to increase the charge on the piezo disk actuator 314 to cause the piezoelectric disk 318 to contract and to thereby cause the metal substrate 320 and the piezoelectric disk 318 to straighten as referred to above. This charge therefore results in the force on the touch screen display 118 for opposing the external applied force and movement of the touch screen display 118 away from the base 308. The charge on the piezo disk actuator 314 can also be removed via a controlled discharge current causing the piezoelectric disk 318 to expand again, releasing the force caused by the electric charge and thereby decreasing the force on the touch screen display 118, permitting the touch screen display 118 to return to a rest position.

Figure 5:
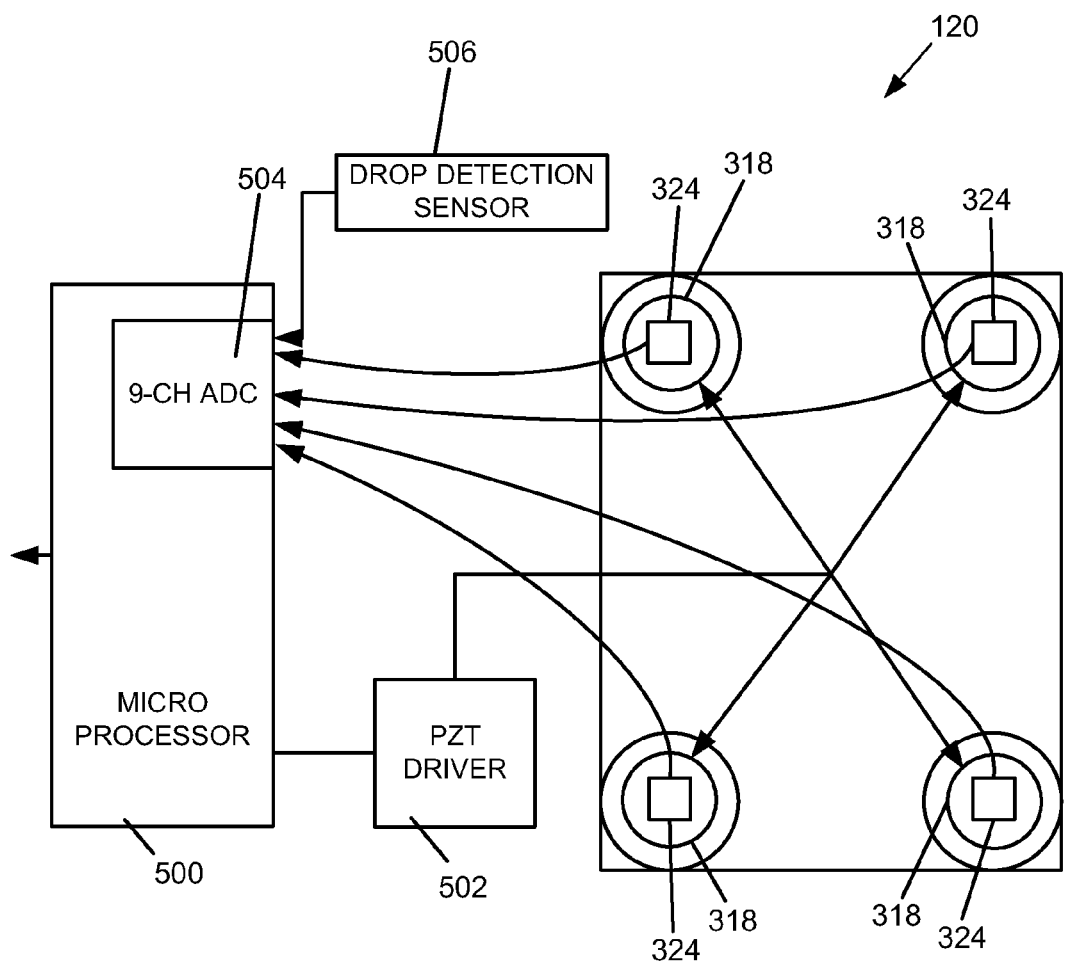
FIG. 5 is a functional block diagram of an actuating and sensing arrangement of the portable electronic device.

FIG. 5 shows the actuating and sensing arrangement 120 according to one embodiment. As shown, each of the piezoelectric disks 318 is connected to a microprocessor 500 including a piezo driver (PZT) 502 and an amplifier and analog-to-digital converter 504 that is connected to each of the force sensors 324 and to each of the piezoelectric disks 318. The microprocessor 500 is also in communication with the main processor 102 of the portable electronic device 100. The microprocessor 500 can provide signals to the main processor 102 of the portable electronic device 100. It will be appreciated that the piezo driver 502 may be embodied in drive circuitry between the microprocessor 500 and the piezoelectric disks 318.

The mechanical work performed by the piezo disk actuator 314 can be controlled to provide generally consistent force and movement of the touch screen display 118 in response to detection of an applied force on the touch screen display 118 in the form of a touch, for example. Fluctuations in mechanical work performed as a result of, for example, temperature, can be reduced by modulating the current to control the charge.

The microprocessor 500 controls the piezo driver 502 for controlling the current to the piezoelectric disks 318, thereby controlling the charge. The charge is increased to increase the force on the touch screen display 118 away from the base 308 and decreased to decrease the force on the touch screen display 118, facilitating movement of the touch screen display 118 toward the base 308. In the present example, each of the piezo disk actuators 314 are connected to the microprocessor 500 through the piezo driver 502 and are all controlled equally and concurrently. Alternatively, the piezo disk actuators 314 can be controlled separately.

The portable electronic device 20 is controlled generally by monitoring the touch screen display 118 for a touch event thereon, and modulating a force on the touch screen display 118 for causing a first movement of the touch screen display 118 relative to the base 308 of the portable electronic device 100 in response to detection of a touch event. The force is applied by at least one of the piezo disk actuators 314, in a single direction on the touch-sensitive input surface of the touch screen display 118. In one example, the touch screen display 118 of the portable electronic device 100 is monitored for a touch event when the portable electronic device 100 is in an on or awake state. In response to determination of a touch event, the charge at each of the piezoelectric disks 318 is modulated to modulate the force applied by the piezo disk actuators 314 on the touch screen display 118 and to thereby cause movement of the touch screen display 118 for simulating the collapse of a dome-type switch. When the end of the touch event is detected, the charge at each of the piezoelectric disks 318 is modulated to modulate the force applied by the piezo disk actuators 314 to the touch screen display 118 to cause movement of the touch screen display 118 for simulating release of a dome-type switch.

The touch screen display 118 is moveable within the housing 200 as the touch screen display 118 can be moved away from the base 308, thereby compressing the compliant gasket 312, for example. Further, the touch screen display 118 can be moved toward the base 308, thereby applying a force to the piezo disk actuators 314.

The analog-to-digital converter 504 is connected to the piezoelectric disks 318. In addition to controlling the charge at the piezoelectric disks 318, an output, such as a voltage output, from a charge created at each piezoelectric disk 318 may be measured based on signals received at the analog to digital converter 504. Thus, when a pressure is applied to any one of the piezoelectric disks 318 causing mechanical deformation, a charge is created. A voltage signal, which is proportional to the charge, is measured to determine the extent of the mechanical deformation. Thus, the piezoelectric disks 318 also act as sensors for determining mechanical deformation.

The actuating and sensing arrangement 120 also includes a drop detection sensor 506, such as a 3-axis accelerometer or other motion sensor for detecting a drop. The drop detection sensor 506 may be used to detect movement of the portable electronic device including, for example a drop event if the portable electronic device 100 is dropped. When a drop or fall is detected, a signal is sent to the microprocessor 500. With the use of an accelerometer for detecting the drop, the accelerometer may also be used for detecting direction of gravitational forces (or gravity-induced reaction forces). Movement of the portable electronic device 100 to alternate orientations may be detected and the orientation of the accelerometer and therefore the orientation of the portable electronic device 100 may be determined.

Figure 6:
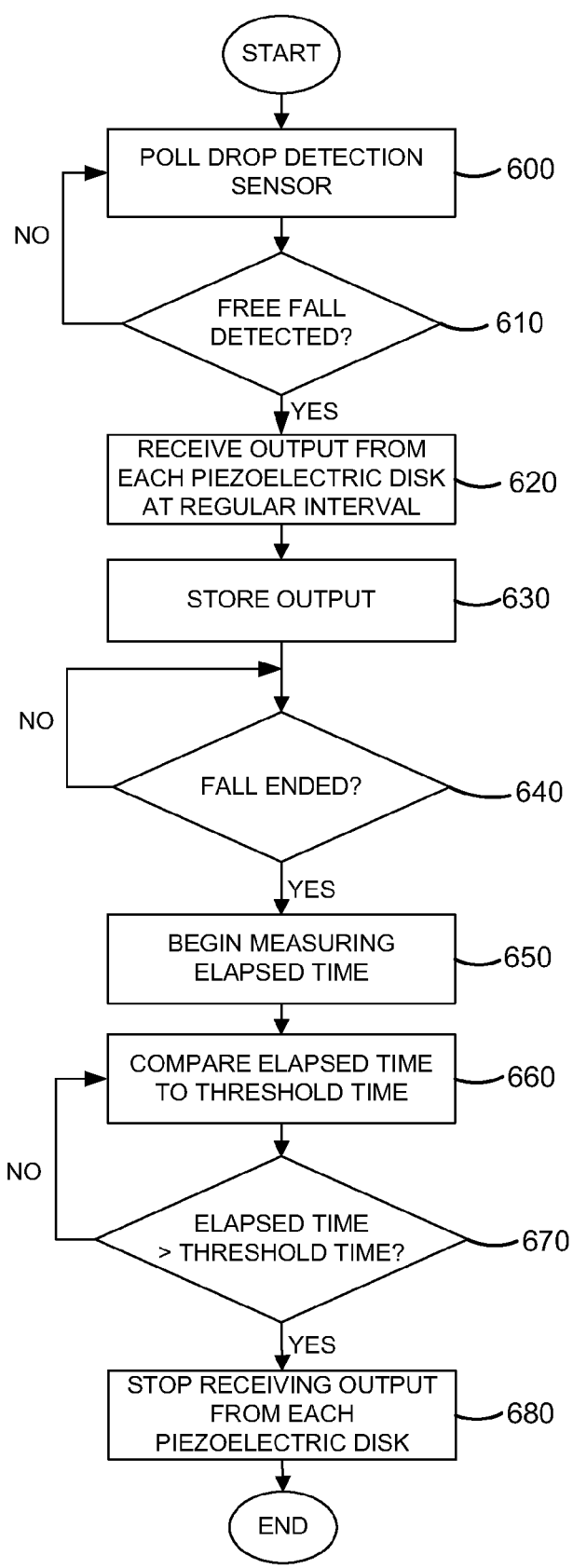
FIG. 6 is a flowchart illustrating a method of detecting a fall.

FIG. 6 shows a flowchart illustrating a method of measuring a drop impact at the portable electronic device 100. The steps of FIG. 6 may be carried out by routines or subroutines of software executed by, for example, the microprocessor 106. Coding of software for carrying out such steps is well within the scope of a person of ordinary skill in the art given the present description.

The drop detection sensor 506 is polled 600 for signals to determine status of the portable electronic device 100 and based on signals from the drop detection sensor 506, the microprocessor 500 determines 610 if a fall is detected. If a fall is not detected, the drop detection sensor 506 is again polled 600. If a fall is detected, the fall is determined based on the signals from the drop detection sensor 506 and the microprocessor 500 begins measuring the output from each of the piezoelectric disks 318 at a regular interval 620. The measured output is stored 630 in memory at the portable electronic device 100. The microprocessor 500 determines 640 if the fall has ended based on signals from the drop detection sensor 506. If the fall has not ended, the microprocessor continues to monitor to determine if the fall has ended. If, on the other hand, it is determined 650 that the fall has ended, the microprocessor 500 begins measuring 650 elapsed time. The microprocessor 500 compares 660 the elapsed time to a preset threshold period of time and determines 670 if the elapsed time is greater than a threshold time period. If the elapsed time is not greater than the threshold time period, the microprocessor 500 again compares 660 the elapsed time to a preset threshold period of time. If, on the other hand, the elapsed time is greater than the threshold time period, the method ends and the measurement of output from each piezoelectric disk 318 is stopped 680.

The flow chart of FIG. 6 is simplified for the purpose of explanation. Further steps and substeps may occur that are not described herein.

Continued reference is made to FIG. 6 to describe an example of the embodiment shown. The present example is provided for the purpose of illustration. As indicated, the drop detection sensor 506 is polled 600 for status signals. In the present example, the microprocessor 500 polls the drop detection sensor 506. The signals are analyzed at the microprocessor 500 and it is determined 610 if the portable electronic device 100 is falling, for example, as a result of being dropped. A fall or drop is determined based on the signals from the drop detection sensor 506, for example, the signals from an accelerometer resulting from the acceleration produced by gravity. If a fall is not detected, the method continues at step 600 where the accelerometer 506 is again polled by the microprocessor 500. Thus, portable electronic device 100 continually monitors for a drop or fall by continually polling the drop detection sensor.

If a fall is detected as a result of, for example, dropping the portable electronic device 100, the fall is detected 610 based on the signals from the drop detection sensor 506 and the microprocessor 500 receives output from each of the piezoelectric disks 318 as the voltage across each of the piezoelectric disks 318 is measured at a regular interval of time so that measurements are repeatedly taken. Each time the voltage is measured, the measured voltage for each of the piezoelectric disks 318 is forwarded to the main processor 100 and, in the present embodiment, stored 630 in the flash memory 110 at the portable electronic device 100. The microprocessor 500 determines 640 if the fall has ended based on signals from the drop detection sensor 506. If the fall has not ended, the microprocessor 500 continues to monitor signals from the drop detection sensor 506 until it is determined that the fall has ended. When it is determined 640 that the fall has ended, the microprocessor 500 begins measuring 650 elapsed time. The microprocessor 500 compares 660 the elapsed time to a predetermined threshold time period and determines 670 if the elapsed time is greater than the threshold time period. If the elapsed time is less than the threshold time period, the microprocessor 500 compares 660 the elapsed time to the threshold time period and determines 670 if the elapsed time is greater than the threshold period of time at a regular interval.

When it is determined that the elapsed time is greater than the threshold time period, the receipt of output from each piezoelectric disk 318 and the measurement and storage of voltage values across the piezoelectric disks 318 is stopped 680. The elapsed time is compared to the threshold period of time to measure voltages across the piezoelectric disks 318 to ensure that measurements are taken and stored for a minimum period of time after impact to measure the damped ringing at the piezoelectric disks 318 after impact. These measured values, referred to as drop data, are taken for later use to analyze drop impacts that the portable electronic device 100 has undergone.

The determination of a fall based on signals from the drop detection sensor therefore triggers the collection of drop data in the form of measured voltage across each piezoelectric disk 318. The voltage across each of the piezoelectric disks 318 is separately measured beginning when the fall is detected and measurements are taken for a period of time after the fall ends and therefore after impact. Each of the measurements is stored in memory at the portable electronic device 100. With an impact, the piezo disk actuators 314 and therefore the piezoelectric disks 318 are mechanically deformed and a change in voltage across each piezoelectric disk 318 can be measured. The change in voltage is dependent on the mechanical deformation and therefore dependent on the impact forces.

An impact from, for example, dropping the portable electronic device 100, results in an initial shock and damped ringing at a given frequency. The initial change in voltage across the piezoelectric disks 318 and the initial amplitude of the ringing may be used in determining the severity of the drop. The damped ringing lasts for a longer period of time than the initial shock. The damped ringing, however, may be used to determine the severity of the initial shock. For example, if the ringing is a damped sine wave, the damping coefficient and frequency of the sine wave may be used to extrapolate the amplitude of ringing, determined by the measured values of voltage, back to the time of initial impact. Therefore, with stored values of voltages measure across the piezoelectric disks 318, a number that is related to the amplitude of ringing may be determined from the stored output by extrapolating back to the time of the initial impact, where an accelerometer signal is highest following determination of fall.

The impact of the portable electronic device 100 may therefore be determined. Orientation information may also be determined based on drop data collected from the piezoelectric disks 318 or from data from an accelerometer prior to impact.

The drop data may be retrieved or read from the flash memory 110, including, for example, a time and date that the fall is detected along with the measurements from the piezo disk actuators 314. If, for example, a device is returned, the drop data may aid in understanding how damage occurred, in diagnosing failures and may be used in design of more robust products. As indicated above, the stored values of voltages measured across the piezoelectric disks 318 may be used to determine a number related to the amplitude of ringing at the time of the initial impact.

In an alternative embodiment, the output from each of the piezoelectric disks 318 may be stored in RAM 108 until the predetermined threshold time is exceeded. The processor 102 then uses this drop data to extrapolate back to determine the number related to peak amplitude of ringing at the time of initial impact. This number may then be stored in flash memory 110. Thus, the measured values are analyzed to determine a number related to the peak amplitude and only the number is stored in the flash memory 110.

In yet another embodiment, a single voltage may be measured across each of the piezoelectric disks 318 at the time of impact and the single voltage may be stored for each of the piezoelectric disks 318.

A method of measuring drop impact at an electronic device is provided. The method includes detecting a fall based on signals from a drop detection sensor of the electronic device, receiving an output from a piezoelectric sensor in response to detecting the fall, and storing drop data based on the output from the piezoelectric sensor in a memory at the electronic device.

A portable electronic device is also provided. The portable electronic device includes a housing, an input device, a display exposed by the housing, a piezoelectric sensor disposed in the housing, a drop detection sensor housed within the housing, and functional components in the housing comprising a memory and a processor. The processor is operably connected to the memory, the input device, the display, the piezoelectric sensor, and the drop detection sensor for executing a program stored in the memory for detecting a fall based on signals from the drop detection sensor, receiving an output from the piezoelectric sensor in response to detecting the fall, and storing drop data based on the output from the piezoelectric sensor in the memory. The stored drop data may be retrieved analyzed from, for example, failed devices, to determine drop impact forces at the portable electronic device. The analysis may be used for designing devices and components of the devices to withstand a typical drop impact.

A computer-readable medium is also provided. The computer-readable medium has computer-readable code embodied therein for execution by a processor in an electronic device for causing the portable electronic device to detect a fall based on signals from a drop detection sensor of the electronic device, receive an output from a piezoelectric sensor in response to detecting the fall, and store drop data based on the output from the piezoelectric sensor in a memory at the electronic device.

The piezoelectric disks not only provide desirable tactile feedback in response to a touch event on the touch screen display, they can also be used for measuring a drop impact as mechanical deformation of the piezoelectric disks caused by a drop impact results in a change in electrical charge and can be measured by a change in voltage. Measurements from the piezoelectric disks advantageously provide information relating drop impacts that are useful in determining history of the device. Further, the piezoelectric disk is thin, therefore not adding significantly to the thickness of the device while providing functionality for both tactile feedback and measurement of drop impact.

As indicated, the measurements may be analyzed later to determine drop impact forces at the portable electronic device. The drop impact measurements provide an indication of the history of drop impacts including number of drops and the impact forces at the piezoelectric disks. The history of drop impacts may be useful for evaluating, for example, damaged portable electronic devices. Portable electronic devices returned after use or after failure may be analyzed and information gathered from these portable electronic devices may be used, for example, in designing to protect device components or for the purpose of determining whether or not to honour device warranty.

While the embodiments described herein are directed to particular implementations of the portable electronic device and the method of controlling the portable electronic device, it will be understood that modifications and variations may occur to those skilled in the art. All such modifications and variations are believed to be within the sphere and scope of the present disclosure.

What is claimed is:

1. A method of measuring drop impact at an electronic device, the method comprising:
   receiving a signal from a drop detection sensor of the electronic device;
   in response to detecting a fall based on the signal from the drop detection sensor:
   receiving output from a piezoelectric device; and
   storing drop data, based on the output from the piezoelectric device, in a memory at the electronic device.

2. The method according to claim 1, wherein receiving an output comprises measuring a voltage across the piezoelectric device.

3. The method according to claim 2, wherein storing drop data comprises storing the measured voltage.

4. The method according to claim 2, wherein receiving output comprises repeatedly receiving output from the piezoelectric device.

5. The method according to claim 4, further comprising extrapolating to estimate an amplitude at impact based on the repeated measurements and a frequency and damping coefficient of the piezoelectric device.

6. The method according to claim 5, wherein storing comprises storing the estimate of the amplitude in memory.

7. The method according to claim 1, wherein receiving output from the piezoelectric device comprises receiving output at regular intervals from the piezoelectric device.

8. The method according to claim 7, comprising in response to detecting an end of the fall, receiving output from the piezoelectric device for a predetermined period of time after detecting the end of the fall and storing drop data, based on the output from the piezoelectric device, in the memory.

9. The method according to claim 1, wherein receiving output from the piezoelectric device comprises receiving output from a plurality of piezoelectric devices.

10. The method according to claim 1, wherein storing drop data comprises storing drop data based on output from a plurality of piezoelectric sensors.

11. The method according to claim 1, further comprising polling the drop detection sensor at regular intervals prior to detecting the fall.

12. The method according to claim 1, wherein the piezoelectric device is utilized to provide tactile feedback in response to detecting a touch on a touch-screen display of the electronic device.

13. A portable electronic device comprising:
    a housing;
    a drop detection sensor housed within the housing; and
    a piezoelectric device disposed in the housing;
    memory; and
    a processor operably connected to the memory, the drop detection sensor, and the piezoelectric sensor, the processor configured to:
    receive a signal from the drop detection sensor;
    receive output from the piezoelectric device in response to detecting a fall based on the signal from the drop detection sensor; and store drop data in the memory based on the output from the piezoelectric device.

14. The portable electronic device according to claim 13, wherein the drop detection sensor comprises an accelerometer.

15. The portable electronic device according to claim 13, wherein the piezoelectric device comprises a piezo disk actuator disposed between a base in the housing and a touch-sensitive display to provide tactile feedback through the touch-sensitive display in response to detecting a touch on the touch-sensitive display.

16. The portable electronic device according to claim 13, further comprising a plurality of piezoelectric devices, including the piezoelectric device, disposed in the housing and operably coupled to the processor such that the processor receives output from each of the piezoelectric devices.

17. A non-transitory computer-readable medium having computer-readable code embodied therein executable by a processor of an electronic device to cause the electronic device to:
  receive a signal from a drop detection sensor of the electronic device;
  in response to detecting a fall based on the signal from the drop detection sensor:
    receive output from a piezoelectric device; and
    store drop data in a memory at the electronic device based on the output from the piezoelectric device.

18. The portable electronic device according to claim 13, wherein the processor is further configured to, in response to detection of an end of the fall, receive output from the piezoelectric device for a predetermined period of time after detecting the end of the fall, and store drop data in the memory based on the output from the piezoelectric device.

* * * * *